(12) United States Patent
Eichhorn

(10) Patent No.: US 11,758,848 B2
(45) Date of Patent: Sep. 19, 2023

(54) DEVICES, SYSTEMS, AND METHODS FOR SENSING THE CROSS-SECTIONAL AREA OF STALKS

(71) Applicant: Ag Leader Technology, Ames, IA (US)

(72) Inventor: Scott Eichhorn, Ames, IA (US)

(73) Assignee: Ag Leader Technology, Ames, IA (US)

( * ) Notice: Subject to any disclaimer, the term of this patent is extended or adjusted under 35 U.S.C. 154(b) by 183 days.

(21) Appl. No.: 17/225,740

(22) Filed: Apr. 8, 2021

(65) Prior Publication Data

US 2021/0318118 A1 Oct. 14, 2021

Related U.S. Application Data

(60) Provisional application No. 63/006,774, filed on Apr. 8, 2020.

(51) Int. Cl.
*A01D 45/02* (2006.01)
*A01D 41/127* (2006.01)
(Continued)

(52) U.S. Cl.
CPC .......... *A01D 45/021* (2013.01); *A01B 63/008* (2013.01); *A01D 41/127* (2013.01);
(Continued)

(58) Field of Classification Search
CPC ... A01B 63/002; A01B 63/004; A01B 63/008; A01D 41/127; A01D 41/12; A01D 41/1271; A01D 41/1272; A01D 41/1273; A01D 41/1277; A01D 41/141; A01D 45/02; A01D 45/021; A01D 45/028; A01D 45/00; A01D 34/006; A01D 34/008; A01D 34/03; G01B 21/06; G01B 21/04; G01B 21/08; G01B 21/10; G01B 21/12; G01B 21/20;
(Continued)

(56) References Cited

U.S. PATENT DOCUMENTS 4,166,349 A 9/1979 Coenenberg et al.
4,883,964 A 11/1989 Bohman
(Continued)

FOREIGN PATENT DOCUMENTS

CA 2313376 7/2000

OTHER PUBLICATIONS

Contributors to Wikimedia projects. (Feb. 20, 2020). Numerical integration. Wikipedia, https://web.archive.org/web/20200325094046/https://en.wikipedia.org/wiki/Numerical_integration (Year: 2020).*
(Continued)

*Primary Examiner* — Daniel R Miller
*Assistant Examiner* — Eric Sebastian Von Wald
(74) *Attorney, Agent, or Firm* — Dentons Davis Brown; Matthew Warner-Blankenship

(57) ABSTRACT

Disclosed herein are various devices, systems, and methods for use in agricultural, particularly for use in harvesting agricultural crop such as corn. Various implementations relate to methods and devices for measuring plant stalk cross-sectional area during harvest and providing additional methods of predicting and displaying yield on a row-by-row level in real time.

16 Claims, 14 Drawing Sheets

(51) Int. Cl.
| | |
|---|---|
| *A01B 63/00* | (2006.01) |
| *G01B 21/06* | (2006.01) |
| *G01D 21/00* | (2006.01) |
| *G08B 5/00* | (2006.01) |
| *G08B 3/00* | (2006.01) |
| *G08B 21/18* | (2006.01) |

(52) U.S. Cl.
CPC ........... *A01D 45/028* (2013.01); *G01B 21/06* (2013.01); *G01D 21/00* (2013.01); *G08B 21/182* (2013.01); *G08B 3/00* (2013.01); *G08B 5/00* (2013.01)

(58) Field of Classification Search
CPC ........ G01B 21/28; G01B 11/00; G01B 11/02; G01B 11/08; G01B 11/24; G01B 5/0035; G01B 5/004; G01B 5/04; G01B 5/06; G01B 5/10; G01D 21/00; G01D 21/02; G08B 21/182; G08B 5/00; G08B 3/00; G05D 2201/0201; G05B 2219/45003; Y10S 426/809
See application file for complete search history.

(56) References Cited

U.S. PATENT DOCUMENTS

| | | | |
|---|---|---|---|
| 4,918,441 | A | 4/1990 | Bohman |
| 5,044,210 | A | 9/1991 | Kuhn et al. |
| 5,568,405 | A | 10/1996 | Easton et al. |
| 5,598,794 | A | 2/1997 | Harms et al. |
| 5,790,428 | A | 8/1998 | Easton et al. |
| 5,878,561 | A | 3/1999 | Gunn |
| 5,991,694 | A | 11/1999 | Gudat et al. |
| 6,073,427 | A | 6/2000 | Nichols |
| 6,085,846 | A | 7/2000 | Buchl et al. |
| 6,119,442 | A | 9/2000 | Hale |
| 6,216,795 | B1 | 4/2001 | Buchl |
| 6,584,390 | B2 | 6/2003 | Beck |
| 6,668,223 | B2 | 12/2003 | Blackmore et al. |
| 6,983,582 | B1 | 1/2006 | Muckler |
| 7,401,528 | B2 | 7/2008 | Deppermann et al. |
| 7,916,898 | B2 | 3/2011 | Anderson |
| 8,010,261 | B2 | 8/2011 | Brubaker |
| 8,196,380 | B2 | 6/2012 | Carboni |
| 8,220,235 | B2 | 7/2012 | Kowalchuk |
| 8,224,534 | B2 | 7/2012 | Kowalchuk |
| 8,418,636 | B2 | 4/2013 | Liu et al. |
| 9,030,549 | B2 | 5/2015 | Redden |
| 9,064,173 | B2 | 6/2015 | Redden |
| 9,066,463 | B2 | 6/2015 | Lange |
| 9,232,693 | B2 | 1/2016 | Hendrickson et al. |
| 9,282,693 | B2 | 3/2016 | Anderson |
| 9,310,329 | B2 | 4/2016 | Acheson et al. |
| 9,320,196 | B2 | 4/2016 | Dybro et al. |
| 9,322,629 | B2 | 4/2016 | Sauder et al. |
| 9,372,109 | B2 | 6/2016 | Acheson et al. |
| 9,410,840 | B2 | 8/2016 | Acheson et al. |
| 9,565,802 | B2 | 2/2017 | Schleicher |
| 9,658,201 | B2 | 5/2017 | Redden et al. |
| 9,693,503 | B2 | 7/2017 | Dybro et al. |
| 9,717,171 | B2 | 8/2017 | Redden et al. |
| 9,756,771 | B2 | 9/2017 | Redden |
| 9,832,928 | B2 | 12/2017 | Dybro et al. |
| 9,867,334 | B2 | 1/2018 | Jongmans et al. |
| 9,867,335 | B1 | 1/2018 | Obbink et al. |
| 9,894,835 | B2 | 2/2018 | Sauder et al. |
| 9,921,064 | B2 | 3/2018 | Schleicher |
| 9,927,242 | B2 | 3/2018 | Schleicher |
| 9,936,631 | B1 | 4/2018 | Hubner et al. |
| 9,936,637 | B2 | 4/2018 | Anderson et al. |
| 10,034,424 | B2 | 7/2018 | Anderson et al. |
| 10,039,231 | B2 | 8/2018 | Anderson et al. |
| 10,537,060 | B2 | 1/2020 | Sauder et al. |
| 10,820,508 | B2 | 11/2020 | Dix et al. |
| 10,859,479 | B2 | 12/2020 | Brune et al. |
| 2014/0230391 | A1* | 8/2014 | Hendrickson ...... G01N 33/0098 702/2 |
| 2015/0319929 | A1* | 11/2015 | Hendrickson ........ G01B 5/0035 33/504 |
| 2019/0059223 | A1* | 2/2019 | Seiders, Jr. .......... A01B 63/008 |
| 2019/0195762 | A1* | 6/2019 | Brune .................. A01B 79/005 |
| 2020/0068803 | A1* | 3/2020 | Sauder .................. A01D 43/00 |

OTHER PUBLICATIONS

Area of a circle. (Mar. 10, 2020). Wikipedia. https://web.archive.org/web/20200325064526/https://en.wikipedia.org/wiki/Area_of_a_circle (Year: 2020).*

Baweja et al., "StalkNet: A Deep Learning Pipeline for High-throughput Measurement of Plant Stalk Count and Stalk Width".

Birrell et al., "Corn Population Sensor for Precision Farming", American Society of Agricultural Engineers. Annual Meeting, 1995, vol. 95, No. 1334, Publisher: ASAE.

"Harvest Study Reveals most corn heads leaving yield in the field.", 2020 Special Report, 2020, Row by Row.

Farm Show, "Easton Goers, Inc. Space Wheel Checks Seed Placement In Field—Space Cadet", 1996, Publisher: Farm Show.

D. Easton, "Corn Population and Plant Spacing Variability: The Next Mapping Layer", 1996, pp. 723-727, Publisher: ASA-CSSA-SSSA, Published in: Madison, WI.

Hummel et al., "Sensing Corn Population—Another Variable in the Yield Equation".

Jonathan P. Kelly, "By-Plant Prediction of Corn Grain Yield Using Height and Stalk Diameter", 2009, Publisher: Faculty of the Graduate College of the Oklahoma State University.

Haizhou Li, "Design and Evaluation of a Non-Intrusive Corn Population Sensor", Trace: Tennessee Research and Creative Exchange, Doctoral Dissertations, Graduate School, Aug. 2007, Publisher: University of Tennessee, Knoxville.

Luck et al., "Sensor Ranging Technique for Determining Corn Plant Population", Faculty Papers and Publications in Animal Science—Animal Science Department, 2008, vol. 920, Publisher: University of Nebraska—Lincoln.

Plattner et al., "Corn Plant Population Sensor for Precision Agriculture", 1996.

"AutoTrac RowSense", Precision AG, , Page(s) https://www.deere.com/sub-saharan/en/technology-products/precision-ag/autotrac-rowsense/. Publisher: John Deere SSA.

Reichhardt Electronic Innovations, "PSR Sensor Guidance", , Page(s) www.reichhardt.com/us_products_autosteer-system_autoguidance-tac.html, Publisher: Reichhardt Electronic Innovations.

Headsight, Inc., Row Guidance for Corn, Jan. 2021, Page(s) https://headsight.com/row-guidance-com, Publisher: Headsight, Inc.

Yeyin Shi, "Corn Plant Location, Spacing and Stalk Diameter Measurements Using Optical Sensing Technologies", May 2014, Publisher: Faculty of the Graduate College of the Oklahoma State University.

Shrestha et al., "Automatic Corn Plant Population Measurement Using Machine Vision", Transactions of the ASAE, 2003, pp. 559-565, vol. 46(2), Publisher: American Society of Agricultural Engineers.

Sudduth et al., "Field Evaluation of a Corn Population Sensor", 2000.

Yu et al., "Outlier Elimination for Robust Ellipse and Ellipsoid Fitting", Oct. 24, 2009.

* cited by examiner

DEVICES, SYSTEMS, AND METHODS FOR SENSING THE CROSS-SECTIONAL AREA OF STALKS

CROSS-REFERENCE TO RELATED APPLICATION(S)

This application claims the benefit under 35 U.S.C. § 119(e) to U.S. Provisional Application 63/006,774, filed Apr. 8, 2020, and entitled Agricultural Devices, Systems, and Methods, which is hereby incorporated herein by reference in its entirety for all purposes.

TECHNICAL FIELD

The disclosure relates to various devices, systems, and methods for use in agricultural applications, particularly for use during agricultural harvest.

BACKGROUND

Various devices, systems, and methods are known for measuring the sizes of stalks. Certain of these known devices utilize mechanical and/or light-based sensors to measure the diameter of stalks. Yet, the diameter of a stalk can be misleading or an inaccurate measure of stalk size because stalks do not have a perfectly circular cross-section but are typically elliptical, oblong, or irregular in shape.

There is a need in the art for accurately determining sizes of stalks of agricultural crop during harvest.

BRIEF SUMMARY

Disclosed herein are various devices, systems, and methods for improving, monitoring, and predicting yields and various other data during agricultural harvests.

The various implementations disclosed herein allow the operator to quantify certain attributes of the harvest in real-time, such as a number or percent of stalks that are productive or unproductive, such as late emerged plants. It is understood that knowing the number and relationship of productive and unproductive stalks is meaningful and useful to the operator.

In various implementations, a threshold cross section can be defined. Stalks below the defined threshold are categorized unproductive, while stalks above are productive. Many implementations are described herein.

In various Examples and/or implementations, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In Example 1, a method for counting and measuring stalks comprising generating displacement signals from one or more sensing members when a stalk passes through a sensor, correlating the displacement signals with velocity data, generating stalk perimeter data, and determining stalk cross sectional area from the stalk perimeter data.

In Example 2, the method of Example 1, further comprising using one or more of rectangular integration, trapezoidal integration, and best fit curve algorithms for determining stalk cross-sectional area from the stalk perimeter data.

In Example 3, the method of Example 1, wherein the sensor comprises one or more of an electromagnetic sensor, a non-contact inductive position sensor, an inductance sensor, a capacitive sensor, an optical sensor, a flexible resistance sensor, a load cell, and an ultrasonic distance sensor.

In Example 4, the method of Example 1, further comprising generating velocity data via one or more of a radar sensor, a lidar sensor, a time-of-flight sensor, an ultrasonic sensor, and a vehicle ground speed sensor.

In Example 5, the method of Example 1, further comprising identifying and excluding outlier displacement signals.

In Example 6, the method of Example 5, further comprising establishing an outlier threshold wherein an outlier displacement signal is identified when the outlier threshold is exceeded.

In Example 7, the method of Example 1, wherein stalk cross-sectional area is determined in real-time or near real-time.

In Example 8, a system for measuring a cross-sectional area of a stalk at a row unit, comprising at least one senor assembly disposed on the row unit, the at least one sensor assembly configured to generate width measurements as the stalk traverses the at least one sensor assembly, and at least one stalk velocity sensor, wherein the width measurements are processed by the system to generate stalk perimeter data from which stalk cross-sectional area is determined.

In Example 9, the system of Example 8, wherein width measurements are taken in real-time or near real-time as the stalk passes through the row unit.

In Example 10, the system of Example 8, wherein the at least one sensor assembly comprises one or more of an electromagnetic sensor, a non-contact inductive position sensor, an inductance sensor, a capacitive sensor, an optical sensor, a flexible resistance sensor, a load cell, and an ultrasonic distance sensor.

In Example 11, the system of Example 10, wherein the at least one sensor assembly comprises an electromagnetic sensor.

In Example 12, the system of Example 11, wherein the at least one sensor assembly comprises one or more contact sensing members.

In Example 13, the system of Example 12, wherein the at least one sensor assembly comprises two contact sensing members.

In Example 14, the system of Example 12, wherein the at least one stalk velocity sensor comprises one or more of a radar sensor, a lidar sensor, a time-of-flight sensor, an ultrasonic sensor, and a vehicle ground speed sensor.

In Example 15, a system for measuring stalks on a corn head row unit comprising a sensor assembly disposed on the row unit, the sensor assembly comprising at least one stalk measuring sensor, and a processor in operative communication with the sensor assembly, the processor configured to process data generated by the sensor assembly to estimate a stalk perimeter.

In Example 16, the system of Example 15, wherein the stalk measuring sensor is configured to generate a plurality of width measurements in a time series and wherein the plurality of width measurements are correlated to an estimated stalk perimeter.

In Example 17, the system of Example 16, wherein the sensor assembly further comprises a velocity sensor.

In Example 18, the system of Example 17, wherein the velocity sensor comprises one or more of a radar sensor, a lidar sensor, a time-of-flight sensor, an ultrasonic sensor, and a vehicle ground speed sensor.

In Example 19, the system of Example 16, wherein the sensor assembly further comprises one or more sensing members.

In Example 20, the system of Example 16, wherein the stalk measuring sensor comprises one or more of an electromagnetic sensor, a non-contact inductive position sensor, an inductance sensor, a capacitive sensor, an optical sensor, a flexible resistance sensor, a load cell, and an ultrasonic distance sensor.

Other embodiments of these Examples include corresponding computer systems, apparatus, and computer programs recorded on one or more computer storage devices, each configured to perform the actions of the methods. Further, implementations of the described techniques may include hardware, a method or process, or computer software on a computer-accessible medium.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1A:
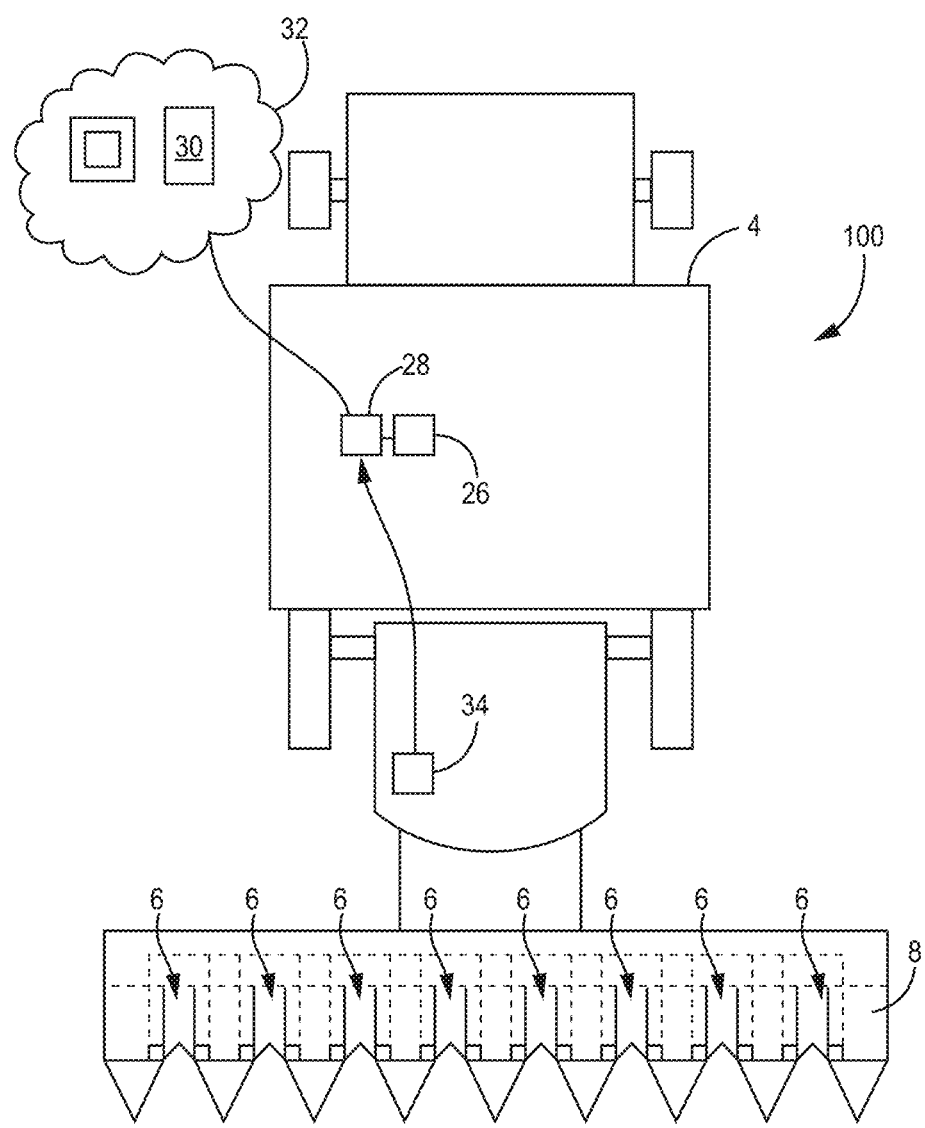
FIG. 1A depicts an agricultural vehicle such as a combine harvester used the system, according to certain implementations.

Disclosed herein are various devices, systems, and methods for measuring plant stalks during harvest. In certain implementations, a system to constructed and arranged to sense multiple widths as a stalk passes through a sensor, the width measurements may then be combined with velocity data to determine widths along a stalk. These data points may then be used with various mathematical techniques to determine a cross sectional area of a stalk.

Certain of the disclosed implementations can be used in conjunction with any of the devices, systems or methods taught or otherwise disclosed in U.S. Pat. No. 10,684,305 issued Jun. 16, 2020, entitled "Apparatus, Systems and Methods for Cross Track Error Calculation From Active Sensors," U.S. patent application Ser. No. 16/445,161, filed Jun. 18, 2019, entitled "Agricultural Systems Having Stalk Sensors and/or Data Visualization Systems and Related Devices and Methods," U.S. patent application Ser. No. 16/800,469, filed Feb. 25, 2020, entitled "Vision Based Stalk Sensors and Associated Systems and Methods," U.S. patent application Ser. No. 17/013,037, filed Sep. 4, 2020, entitled "Apparatus, Systems and Methods for Stalk Sensing," U.S. patent application Ser. No. 16/918,300, filed Jul. 1, 2020, entitled "Apparatus, Systems, and Methods for Eliminating Cross-Track Error," U.S. patent application Ser. No. 16/921, 828, filed Jul. 6, 2020, entitled "Apparatus, Systems and Methods for Automatic Steering Guidance and Visualization of Guidance Paths," U.S. patent application Ser. No. 16/939, 785, filed Jul. 27, 2020, entitled "Apparatus, Systems and Methods for Automated Navigation of Agricultural Equipment," U.S. Patent Application 63/048,797, filed Jul. 7, 2020, entitled "Apparatus, Systems, and Methods for Grain Cart-Grain Truck Alignment and Control Using GNSS and/or Distance Sensors," U.S. Patent Application 63/074,737, filed Sep. 4, 2020, entitled "Apparatus, Systems and Methods for an Electric Corn Head," U.S. Patent Application 63/137,946, filed Jan. 15, 2021, entitled "Apparatus, Systems, and Methods for Row Crop Headers," U.S. patent application Ser. No. 17/225,586, filed Apr. 8, 2021, and entitled "Devices, Systems, and Methods for Corn Headers," and U.S. patent application Ser. No. 17/226,002 filed Apr. 8, 2021 and entitled "Apparatus, Systems and Methods for Stalk Sensing," each of which are incorporated herein by reference.

Various methods and associated devices are known in the art for detecting and measuring plant stalk size during harvest. For example, known methods include measuring the displacement of stripper/deck plates as a measurement of stalk diameter.

In another example, a known method includes measuring maximum rotation/displacement of sensing members. These known methods and devices do not account for the elliptical nature of many plant stalks. Due to their elliptical nature plant stalks may have varying diameters depending on the particular orientation of the stalk as it enters a harvester row unit. The elliptical nature is such that a diameter may not be an accurate predictor of stalk size, because diameter does not accurately reflect the area of a non-circular object. As would be appreciated stalk diameter can vary by around 20-30% across different orientations. Measurement of the cross-sectional area of a plant stalk is a more accurate measure of stalk size, and therefore the plant's health, when compared to diameter-based measurements.

In various implementations, the disclosed measurement system 100 and associated methods and devices improve upon the prior art by allowing for the design principles and technologies for the cross-sectional measurement of stalks in real- or near-real-time as they pass through a row unit such as via a harvester row unit.

Turning now to FIG. 1A, it is readily appreciated that the disclosed measurement system 100 may be used in connection with any known harvester 4. It is understood that a harvester 4 may be configured to harvest row crops via a number of row units 6. In various implementations such as that of FIG. 1A, a harvester 4 is configured to harvest crops through the row units 6 disposed on the corn head 8, as would be readily appreciated. The typical operation of a corn head 8 and row units 6 thereof are readily appreciated and understood by those of skill in the art. As would be understood, the plurality of row units 6 on a head 8 are typically substantially identical, while some variances are possible.

Figure 1B:
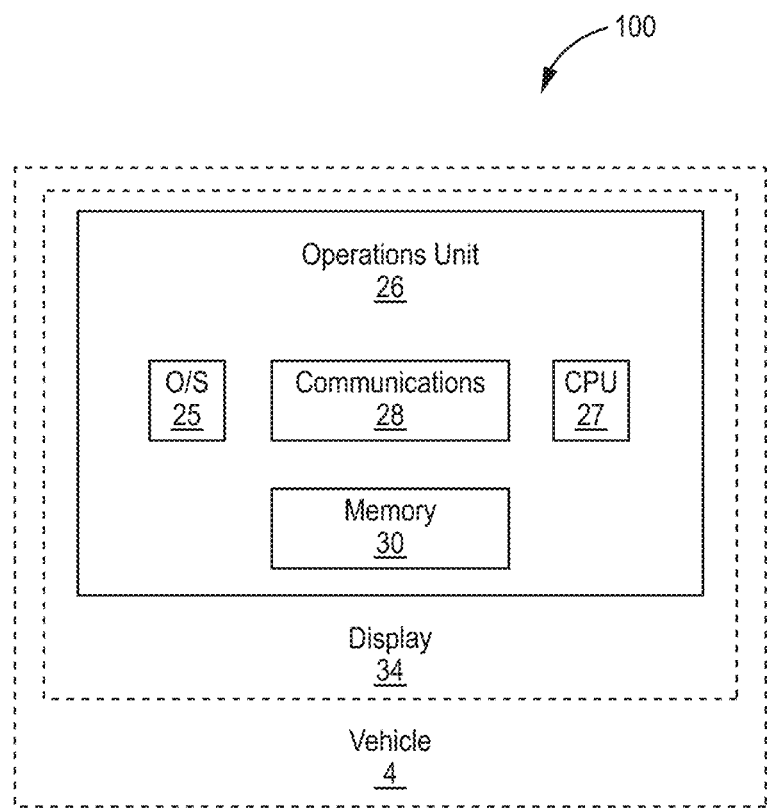
FIG. 1B is a system diagram, according to one implementation.

In various implementations of the system 100, and as shown in FIG. 1B, it is understood that the various functions discussed herein are performed via an operations unit 26, which may be located in the cab of the vehicle or harvester 4. Briefly, the operations unit 26 comprises the various processing and computing components necessary for the operation of the system 10, including receiving, recording, and processing the various received signals, generating the requisite calculations, and commanding the various hardware, software, and firmware components necessary to effectuate the various processes described herein.

That is, in certain implementations, the operations unit 26 comprises a processor or central processing unit ("CPU") 27 that is in communication with memory 30 and an operating system ("O/S") 25 and/or software and sufficient media to effectuate the described processes, and can be used with an operating system 25, memory 30, and the like, as would be readily appreciated by those of skill in the art. It is appreciated that in certain implementations, the memory 30 can be local, as shown in FIGS. 1A-1B, or cloud-based 32, or some combination thereof.

In various implementations, the system 10 operations unit 26 can comprise a circuit board, a microprocessor, a computer, or any other known type of processor or central processing unit (CPU) 27 that can be configured to assist with the operation of a system, such as the device disclosed or contemplated herein. In further embodiments, a plurality of CPUs 27 can be provided and operationally integrated with one another and the various components, as utilized in other applications including the contemporaneously filed applications incorporated by reference herein. Further, it is understood that one or more of the operations units 26 and or its processors can be configured via programming or software to control and coordinate the recordings from and/or operation of the various sensor components, such as the sensing members 12A, 12B, as would be readily appreciated.

In certain implementations, the system 10 and/or operations unit 26 may utilize GPS 28 and a database 30 or other storage device such as the cloud 32, shown in FIGS. 1A-1B, to store recorded data, such as via a communications unit 28, such as a WiFi or cellular connection.

Further, the system 100 may be configured to numerically display the observed data, such as via the display 34, shown in FIGS. 1A-1B. Various display 34 types are of course possible and are known in the art, such as the InCommand® display from Ag Leader. In certain implementations, the data can be recorded and logged, such as via an on-board database 30 and/or cloud 32 storage system. In some implementations, the system 10 settings are recorded and logged with reference to the vehicle position, such as the GPS 28 position, as would be readily apparent to those of skill in the art from the incorporated references. In these and other implementations, the system 10 may create and display maps to provide insights into crop conditions and performance, such as via a display 34.

Figure 2A:
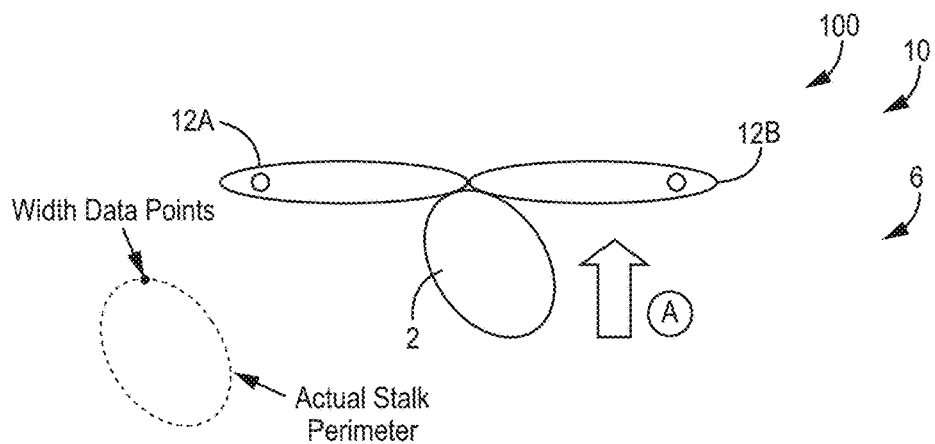
FIGS. 2A-C depict schematic drawings of a stalk passing through a sensor, according to one implementation.
Figure 2B:
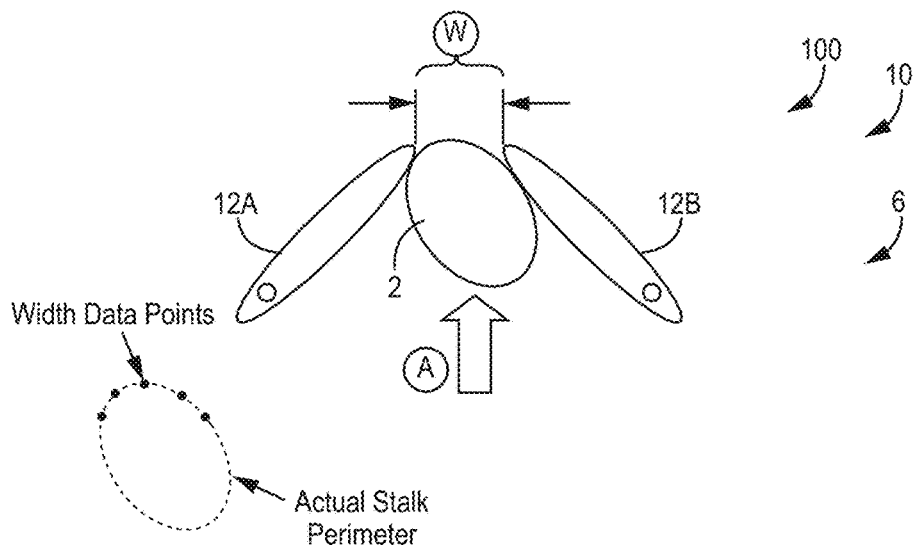
Figure 2C:
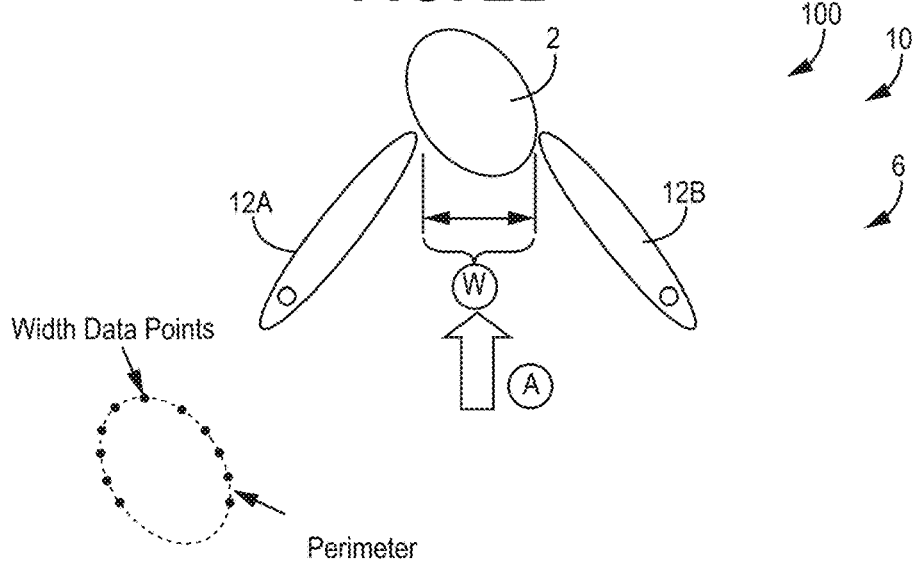

As shown in FIGS. 2A-C, according to certain implementations of the system 100, each one or more harvester row units 6 includes one or more sensor assemblies 10 having one or more sensing members 12A, 12B, as would be appreciated by those of skill in the art and described in detail in the incorporated references. In these and other implementations of the system 100, the sensing members 12A, 12B are pivotally attached to the row unit 6 such that as a stalk 2 passes through the row unit 6 in the direction of reference arrow A, the sensing members 12A, 12B correspondingly pivot, thereby generating displacement data. It is readily appreciated that various implementations only have one sensing member 12A, 12B, or other sensor assembly 10 configuration. It is further appreciated, as described below, that in use according to implementations having two sensing members 12A, 12B, the individual sensing members 12A, 12B may pivot to different ranges and/or for differing durations, and that the sensor assemblies 10 are configured to detect these individual patterns.

Continuing with the implementations of FIGS. 2A-2C, the pivoting movement of the sensing members 12A, 12B—shown for example between FIGS. 2A and 2B—may be detected by various sensors and converted into displacement data and stalk width values—shown in FIG. 2B and FIG. 2C at W—via any known or developed method. It is appreciated that these instantaneous or near real-time measurements are taken over a time-series, and that they are not necessarily continuous, as discussed below in reference to FIGS. 5A-6B.

Continuing with the implementations shown in FIGS. 2A-2C, alternate implementations replace the pivoting sensing members 12A, 12B with flexible, resilient, member(s) that deform accordingly as the stalk 2 passes by, like those in U.S. application Ser. Nos. 17/013,037, 16/445,161 and 16/800,469, each of which is incorporated by reference in their entirety. Briefly, certain sensor assemblies 10 may include electromagnetic sensors, non-contact inductive position sensors, inductance sensors, capacitive sensors, optical sensors, flexible resistance sensors, load cells, ultrasonic distance sensors, or other sensor types as would be appreciated by those of skill in the art that are configured to record the motion of the sensing members 12A, 12B as a stalk 2 passes through the sensor assembly 10.

In alternative implementations, the sensor assembly 10 may not include sensing member 12A, 12B but instead generate distance or width data via other known techniques such as optical or other non-contact sensors, as would be appreciated and has be previously disclosed.

As noted above, in one exemplary implementation, the sensor assembly 10 may generate a plurality of width measurements over time for each stalk 2 that passes through the sensor assembly 10. The plurality of width measurements may be combined with measurements of stalk 2 velocity relative to the sensor assembly 10 to generate a stalk perimeter value for the stalk 2. These generated stalk perimeter values can be used to calculate stalk cross-sectional areas via various known methods, algorithms, and mathematical formulas, including but not limited to rectangular integration, trapezoidal integration, geometric area calculation of best fit ellipse to the measured perimeter, piecewise ellipse approximation using circular arcs, and others as would be appreciated by those of skill in the art.

In some implementations and/or configurations, the sensing members 12A, 12B may be overlapping in the sensor assembly 10. In these implementations, to measure the stalk 2 width the deflection values of both sensing members 12A, 12B may be added together and the amount of overlap subtracted, such that when the sensing members 12A, 12B are overlapping a negative width or distance is recorded and when the tips of the sensing members 12A, 12B are touching the recorded distance is zero. It is readily appreciated that further configurations are of course possible.

In any event, in various implementations, on the basis of the movement of the sensing members or other individual stalk sensor readings, there are a number of ways to estimate or measure stalk velocity past the sensing members 12A, 12B or other sensors.

It is appreciated that vehicle ground speed may be used as one implementation for the approximation of stalk 2 velocity through the sensor assembly 10. However, stalks 2 frequently must exert force to open mechanical sensing members 12A, 12B, like those described above. The resistance created by mechanical sensing members 12A, 12B may causes the stalks to flex to some degree before passing through the sensor assembly 10. This stalk 2 and sensor assembly 10/sensing member 12A, 12B interaction often causes the stalk velocity to vary from recorded vehicle ground speed.

Further, in various implementations, stalks 2 can also be captured and pushed past through the sensor assembly 10 and/or the sensor members 12A, 12B by gathering chain/fingers, as would be understood, again imparting a velocity that is different from vehicle ground speed. Accordingly, vehicle ground speed may serve as an imperfect proxy for establishing actual stalk velocity at the time the stalk 2 passes through the sensor assembly 10.

To improve stalk velocity accuracy, alternate measurement techniques may be employed in certain implementations of the system 100. Distance measuring sensors such as radar, lidar, time-of-flight, or ultrasonic ranging may be used to record the rate of change in distance over time while a stalk 2 is passing through the sensing members 12A, 12B, and thereby provide a more accurate stalk velocity for the system 100.

In various implementations, a video camera may be used in conjunction with image recognition to identify the corn stalk, 2 track its progress through the camera's field of view, and estimate its velocity based on the known distance between the camera and the sensing members 12A, 12B. One or more light gates may be placed near the sensing members 12A, 12B and used to estimate stalk velocity based on the elapsed time between breaking each light gate's beams.

Figure 3A:
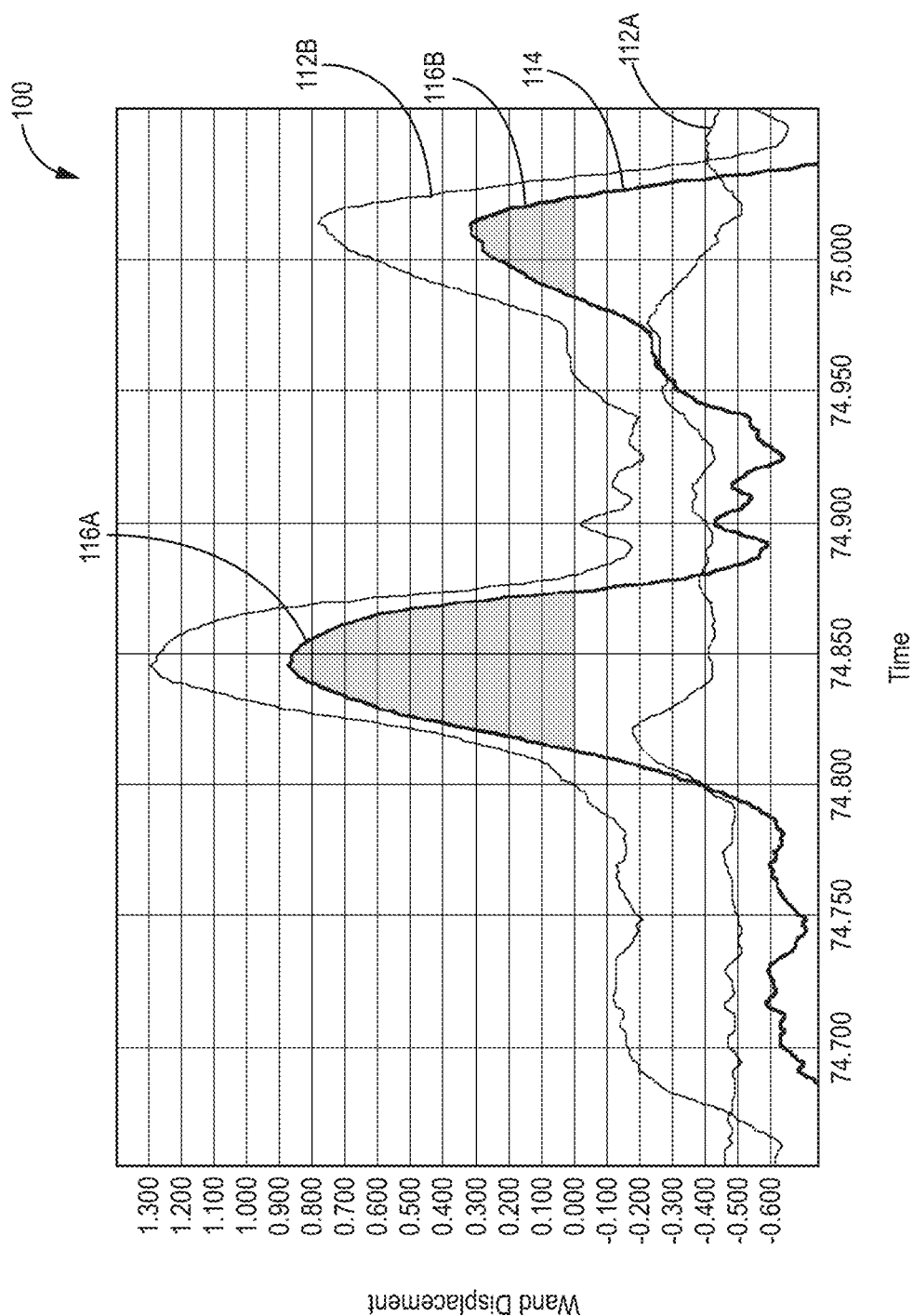
FIG. 3A shows a graphical representation of sensor member displacement over time, according to one implementation.
Figure 3B:
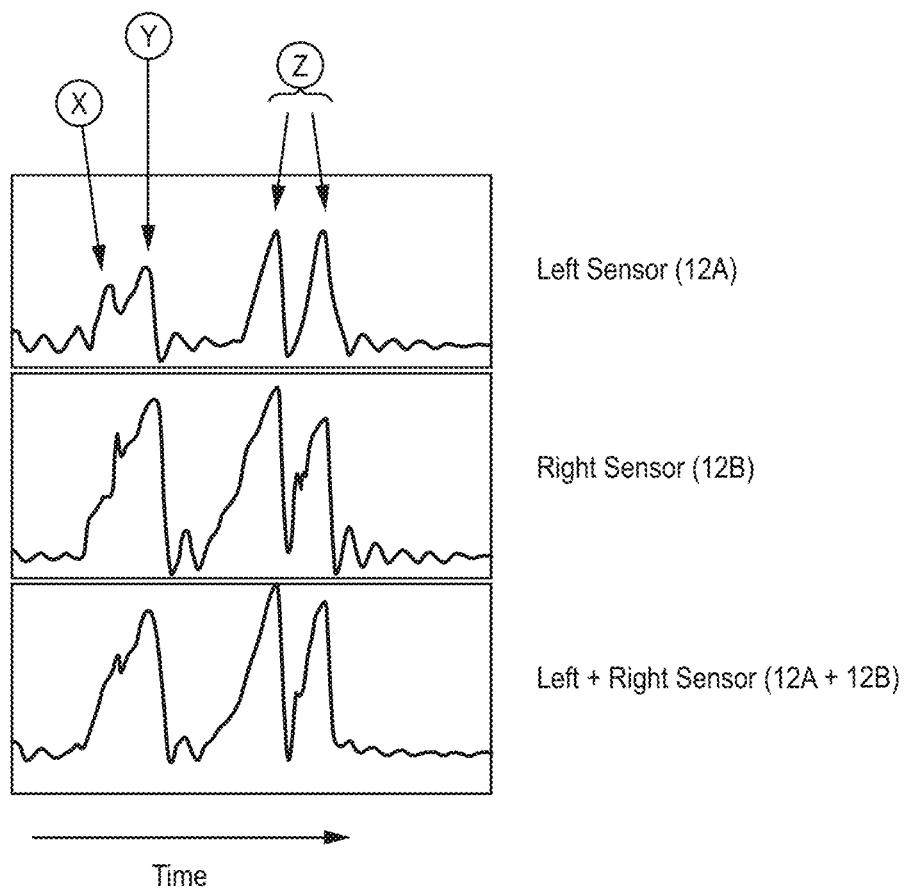
FIG. 3B depicts further graphical representations of stalks passing through a sensor assembly and displacing sensor members, according to one implementation.
Figure 3C:
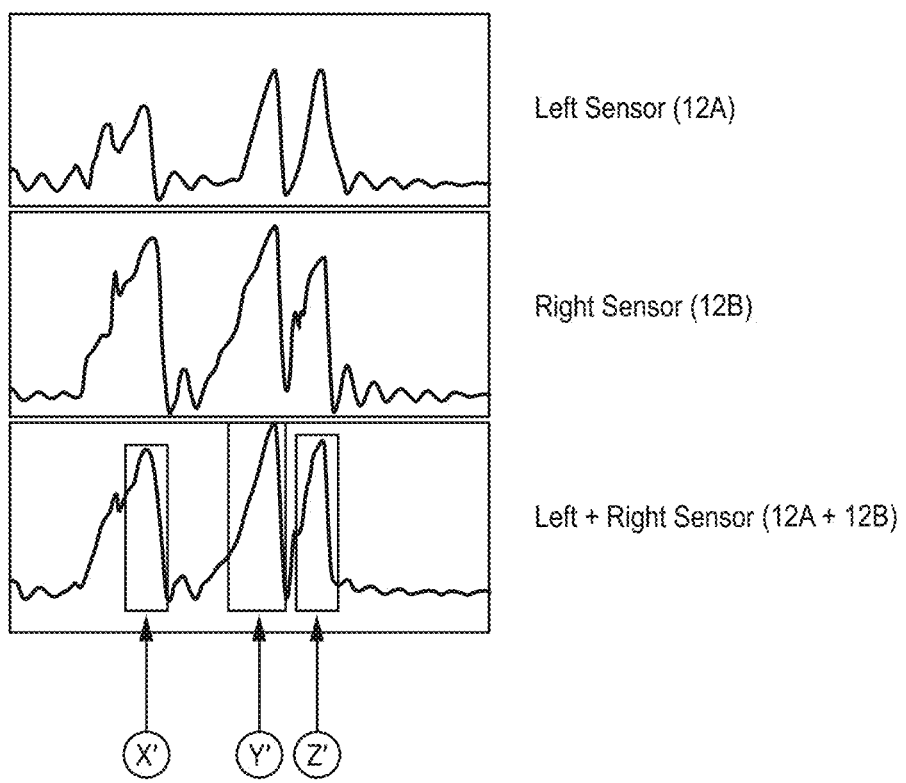
FIG. 3C depicts the graphical representations of stalks passing through a sensor assembly and displacing sensor members of FIG. 3B, highlighting certain data segments of interest, according to one implementation.

FIGS. 3A-3C depict various exemplary readings generated by stalk 2 movement through the sensor assembly 10. In use, when a stalk 2 initially impacts the sensing members 12A, 12B, it may force the members partially open without passing through entirely. It is appreciated that only after sufficient force has been exerted by the stalk flexing against the sensing members 12A, 12B will it pass through the sensor assembly 10. As described herein, this rigid snapping characteristic of stalks 2 can reduce the accuracy of recorded cross-sectional measurements unless properly accounted for. This can create an issue in the estimate of total yield and other advantages, by overestimating the cross-sectional area 116 of the stalk 2.

FIG. 3A is a graph of displacement data for two sensing members 12A, 12B, where the area under the curve (displacement over time) is used to measure stalk cross-sectional area by the system 100, both in real-time and in the aggregate. In these implementations, the signal at 112A shows displacement for one sensing member 12A and the signal 112B shows displacement for another sensing member 12B. It is appreciated that in alternate implementations, a second sensing member 12B would be omitted.

Continuing with the implementation of FIG. 3A, the values at 114 show the displacement values of both sensing members 12A, 12B added together (112A+112B). In various of these implementations, the system 100 calculates the area under the curve when the combined displacement values 114 are greater than zero. The area under the curve that is greater than zero may be a measure of stalk cross-sectional area. In this particular example, the area at 116A is larger than the area at 116B, and as such the stalk measured at area 116A is larger than the stalk measured at area 116B.

It is readily understood by those of skill in the art that thinner stalks likely have decreased yields when compared to full size stalks. For example, unproductive stalks—often caused by late plant emergence compared to neighbor plants—can significantly impact yield. Corn plants that emerge later than adjacent plants within a row typically do not match the size of the adjacent plants. Estimates used among those of skill in the art is about a 50% yield loss for plants behind by one leaf and about a 100% yield loss for plants behind two or more leaves. These unproductive plants have characteristic thin stalks and very small ears. Empirically, unproductive plants are about half the size of thriving plants. For example, unproductive plants typically have about a 50% thinner stalk size than productive plants. For example, in the implementation of FIG. 3A, the system 100 may recognize the stalk 2 measured at the area of 116A to be a full or productive plant, while the stalk 2 measured at the area of 116B as unproductive plant due to its significantly smaller size. Many examples and implementations are of course possible.

Turning to FIG. 3B, these graphs show an example where (at X) a stalk impacts and displaces one of the sensing members 12A, 12B before rebounding and passing fully through the sensor assembly 10 (at Y), as recorded over time by individual sensing members 12A, 12B (top and middle panels) and together (bottom panel). This rebounding phenomenon must be accounted for, because if all of the displacement measurements from initial impact until the stalk 2 has fully passed through the sensor assembly 10 were used in the cross-sectional area calculation, it is likely the area measurement would be too large in comparison to the actual stalk 2 size, leading to an inaccurate measurement.

FIG. 3B also depicts (at Z) two stalks passing through the sensor assembly 10 in rapid succession.

FIG. 3C depicts exemplary data segments (shown at X', Y' and Z') for each stalk 2 to be used in cross-sectional area calculations. These data segments can be identified using a machine learning algorithm or other deterministic method understood in the art. Important characteristics of these data segments (X', Y' and Z') include continuous forward motion past the sensing members, clear increasing displacement followed by a peak and subsequent decreasing displacement, and sufficient displacement to indicate the presence of a plant stalk.

in various implementations, a machine learning algorithm trained to identify these characteristics by collecting displacement data on a large set of corn stalks and annotating the data to indicate the desirable data segments. Alternately, a range of ellipses could be compared to portions of the displacement data until a sufficiently good fit is found. For example, in the illustrated example, an ellipse may provide a better fit for X' than for the displacement that also includes the initial impact and flex of the stalk. One of skill in the art would be readily able to facilitate the machine learning process. Further, in one exemplary implementation, the system 100 utilizes only the second diameter peak when either sensing member 12A or 12B records two or more peaks before dropping below a predetermined threshold value. Further implementations are of course possible and would be readily appreciated.

Figure 4A:
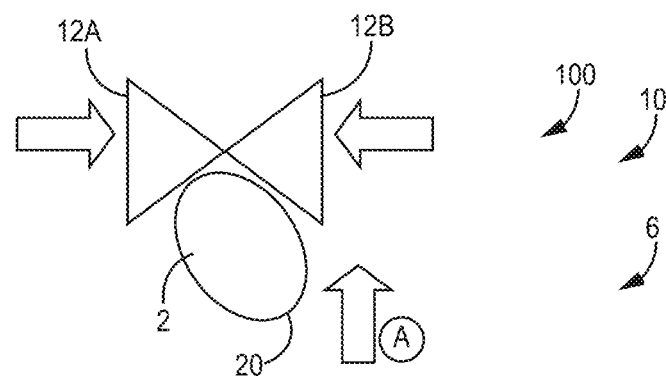
FIGS. 4A-C depict further schematic drawings of a stalk passing through another sensor assembly, according to another implementation.
Figure 4B:
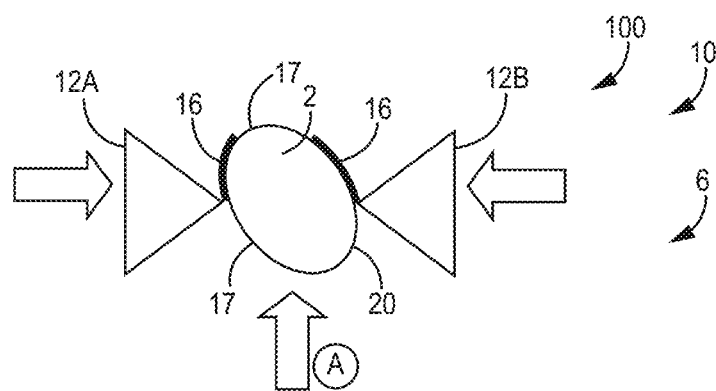
Figure 4C:
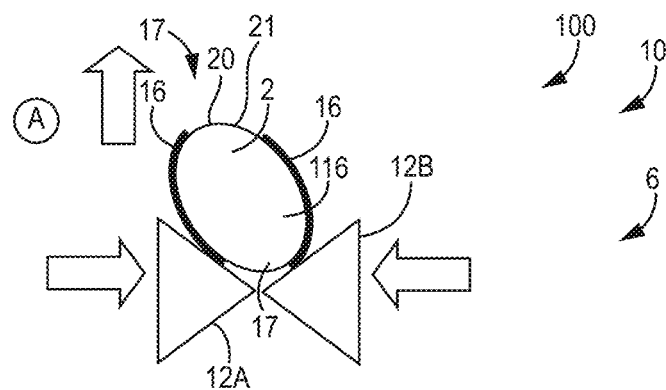

Turning now to FIGS. 4A-C, in some implementations, the sensing members 12A, 12B may not be able to measure the entire perimeter 20 of stalk 2, due to inherent restrictions in the shape, design, and/or configuration of the sensor assembly 10 and/or sensing members 12A, 12B. Further, dynamic and/or inertial limitations of the sensing members 12A, 12B may limit the ability of the sensor assembly 10 to detect and measure the entire perimeter 20 of a stalk 2 and generate an accurate estimated stalk perimeter 21 and corresponding cross-sectional area 116.

Accordingly, in use in these situations, there can be recorded perimeter regions 16 as well as gaps (shown generally at 17), which can make establishing an estimated perimeter 21 and therefor stalk cross-sectional area 116 more challenging.

Figure 5A:
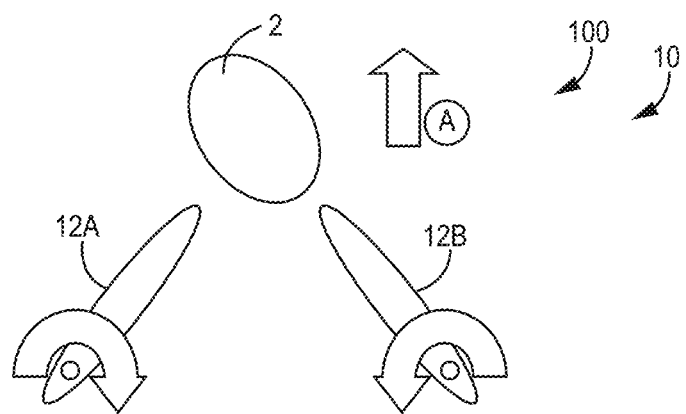
FIG. 5A shows another exemplary implementation of a stalk passing through another sensor assembly, according to one implementation.
Figure 5B:
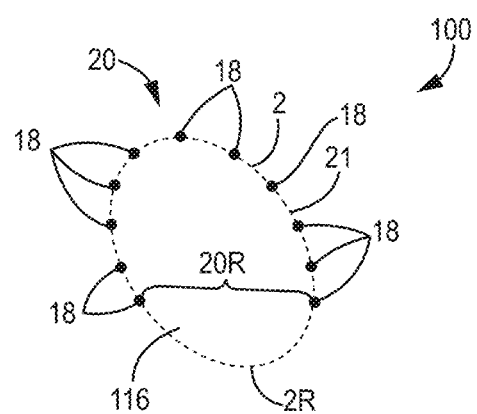
FIG. 5B shows a schematic depiction of recorded data points from the passage of the stalk through the sensor assembly of FIG. 5A.

In one example, shown in FIGS. 5A-5B, as the stalk 2 passes through the sensor assembly 10, the sensing member 12A, 12B displacement over time can be recorded as a series of perimeter data points 18 along the actual stalk perimeter 20, wherein the data points 18 are used to draw an estimated perimeter 21. That is, these individual data points 18 can, in turn, be used to estimate the perimeter 21 via various mathematical approaches described herein. It is appreciated that various aspects of the system 100 are highly accurate and have high fidelity in accurately estimating the perimeter 21 for use in estimating the overall cross-sectional area 116 of the stalk 2.

However, as shown in FIG. 5B, the sensing members 12A, 12B may not close—that is, return to a neutral position—fast enough to remain in contact with the rear of the stalk 2 (shown at 2R). As such the sensing member 12A, 12B do not generate perimeter data points for the rear 2R of the stalk 2. In this example, the system 100 does not measure the rear perimeter region (shown generally at 20R), such that a portion of the perimeter data is recorded with data points 18, and a portion of the data is not recorded, such as the rear perimeter region 20R.

Figure 6A:
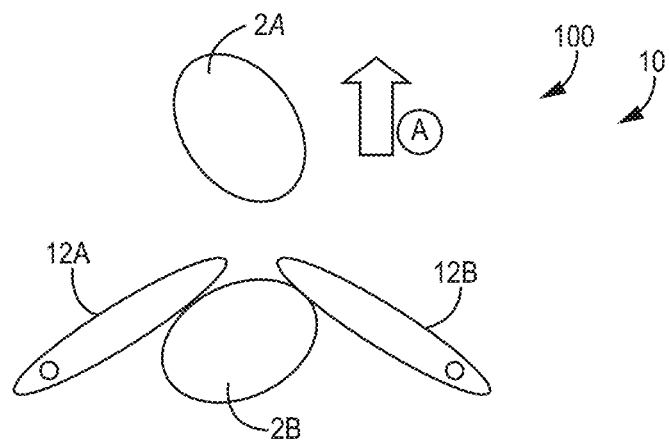
FIG. 6A shows another exemplary implementation of two stalks passing through another sensor assembly, according to one implementation.
Figure 6B:
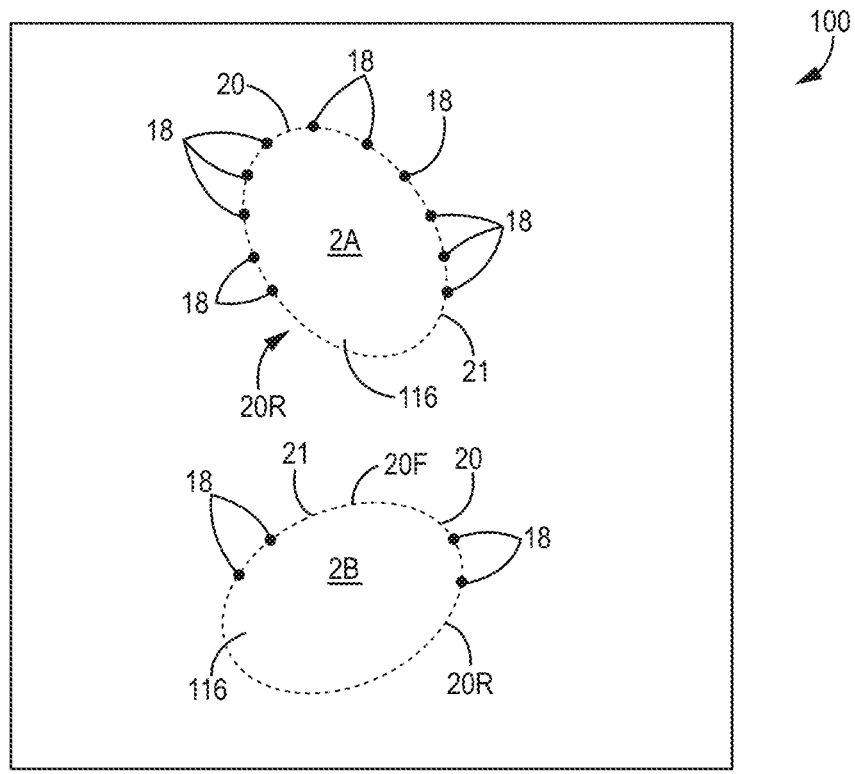
FIG. 6B shows a schematic depiction of recorded data points from the passage of the stalks through the sensor assembly of FIG. 6A.

In another example, shown in FIGS. 6A-6B, in use when stalks 2A, 2B enter the sensor assembly 10 in rapid succession, the sensing members 12A, 12B may not have time to fully close (or return to neutral) before a second stalk 2 enters the sensor assembly 10. In this example, the inability of the sensing members 12A, 12B to fully close or return to a neutral position causes a loss of data of the stalk perimeter 20 due to missing data points 18 at the rear perimeter region 20R of the first stalk 2A and the front perimeter region 20F and possibly rear perimeter region 20R of the second stalk 2B. Other challenges in the comprehensive recording of perimeter data points 18 would be apparent to those of skill in the art.

However, in certain implementations of the system 100 like that of FIGS. 5A-6B, the partial set of data points 18 with omitted perimeter regions 20F, 20R may be used to determine the cross-sectional area of a stalk 2 by utilizing understood mathematical principles and statistical tools.

Figure 7:
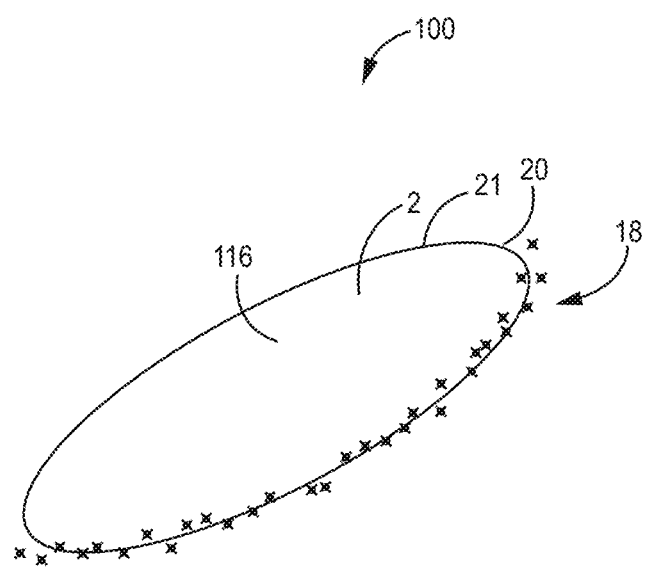
FIG. 7 shows a best fit ellipse constructed from sensor data, according to one implementation.

That is, the system 100 according to these implementations can utilize the measured points to estimate the shape for the missing points to complete the stalk 2 perimeter, and therefore measure or establish the stalk 2 cross-sectional area. In some implementations, the system 100 utilizes known curve-fitting methods and techniques to calculate an ellipse that best fits the measured collection of points shown generally at 18 around the perimeter 20 on a 2-D plane, such as shown in FIG. 7. One such method uses a mathematical representation of an elliptical path. in such a method, a least-squares optimization is used to progressively iterate the parameters defining the shape of the ellipse until the sum of the squared distance error between the data points and ellipse is minimized. Realistic constraints on the size and eccentricity of the path are established to prevent numerically optimum but impossible results. Further examples can utilize methods such as those described in Z. L. Szpak, W. Chojnacki, and A. van den Hengel, "Guaranteed ellipse fitting with a confidence region and an uncertainty measure for centre, axes, and orientation", J. Math. Imaging Vision, 2015, which is hereby incorporated by reference. Further approaches are of course possible, as would be readily appreciated by those of skill in the art.

Figure 8A:
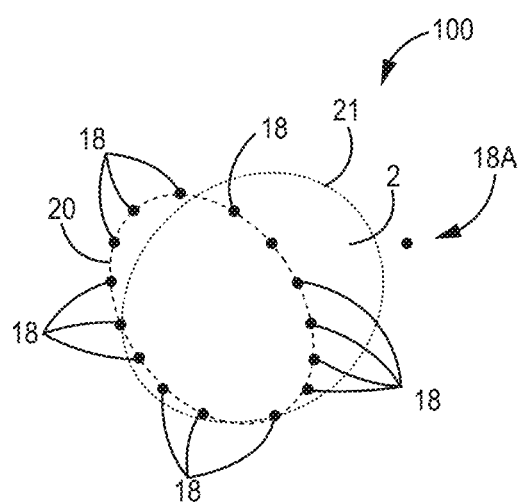
FIG. 8A shows a best fit ellipse constructed from sensor data before the elimination of outliers, according to one implementation.
Figure 8B:
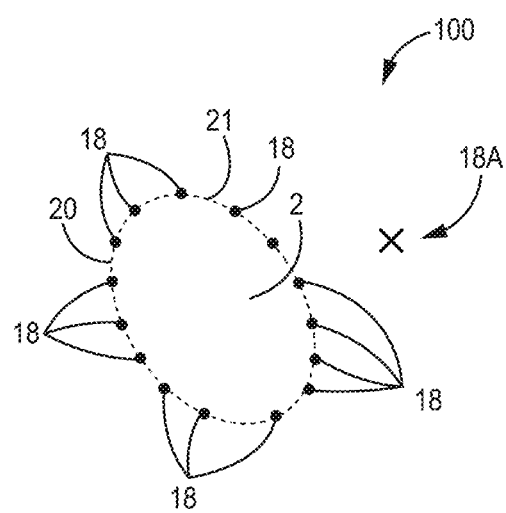
FIG. 8B shows a best fit ellipse constructed from the sensor data of after the elimination of the outlier shown in FIG. 8A, according to one implementation.

In further implementations, the system 100 may be constructed and arranged to disregard or otherwise neutralize errors due to, among other things, sensor noise, plant debris, and other environmental effects. In some implementations, the system 100 may utilize a curve fitting algorithm such that various outlying data points 18A significantly affect the fitted curve are eliminated, as shown in FIGS. 8A-8B.

That is, the inclusion of an outlying data point 18 can skew or otherwise distort the estimated perimeter 21 drawn by the system 100, such that it does not accurately fit with the ground truth actual perimeter 20. In the example of FIGS. 8A-B, by excluding the outlying data point 18A, the system 100 is able to more accurately draw the estimated perimeter 21 to accurately reflect the actual shape and position of the actual perimeter 20.

In certain implementations, the system 100 may be constructed and arranged to detect outlying points 18A via mathematical and statistical techniques, as would be appreciated. That is, outlying points 18A may be detected by determining the data points 18 that have a residual error greater than a given defined outlier threshold. These outlying data points 18A can then be rejected, and a new estimated perimeter 21 curve fitted to the remaining points 18, as shown in FIG. 8B.

One such example employs algebraic graph theory using proximity information of the data points in addition to a model-based outlier detection algorithm. in this example, the algebraic graph is constructed by connecting adjacent data points 18. The graph Laplacian is constructed and the eigenvalues and eigenvectors are calculated. Data points are classified as outliers if the associated eigenvalues are close to zero, for example 0.1, and are data points that correspond to the non-zero elements of binary eigenvectors with very few 1's in the vector. After these outliers have been removed from the data set additional outliers may be identified by employing a random sample consensus algorithm (RANSAC). This algorithm fits a model to a random selection of data points and tests it against the remaining data using a cost function. Remaining points that fit the model well, based on the cost function, are included in the consensus set. If there are a sufficient number of points in the consensus set the model is considered valid. Otherwise a new, random set of data points is selected and the process is repeated. Certain approaches are discussed in Yu, H. Zheng, S. R. Kulkarni, H. V. Poor, "Outlier elimination for robust ellipse and ellipsoid fitting," in Proc. 3rd IEEE Int. Workshop Comput. Adv. Multi-Sensor Adapt. Process. (CAMSAP), Aruba, Dutch Antilles, December 2009, pp. 33-36, which is hereby incorporated by reference. Further examples are of course possible and would be readily appreciated by those of skill in the art.

Figure 9A:
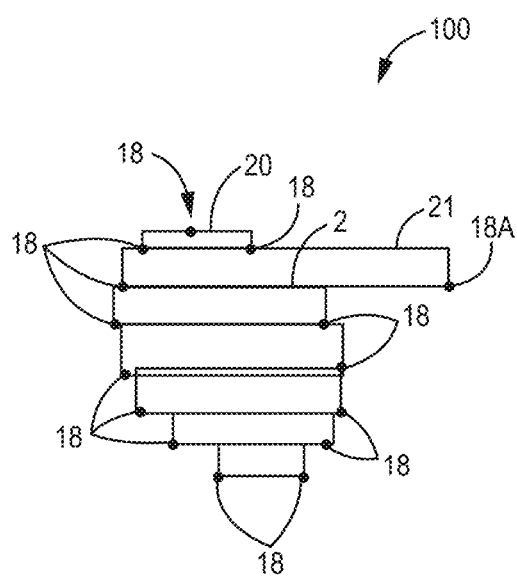
FIG. 9A shows area estimation calculations from sensor data before the elimination of outliers, according to one implementation.
Figure 9B:
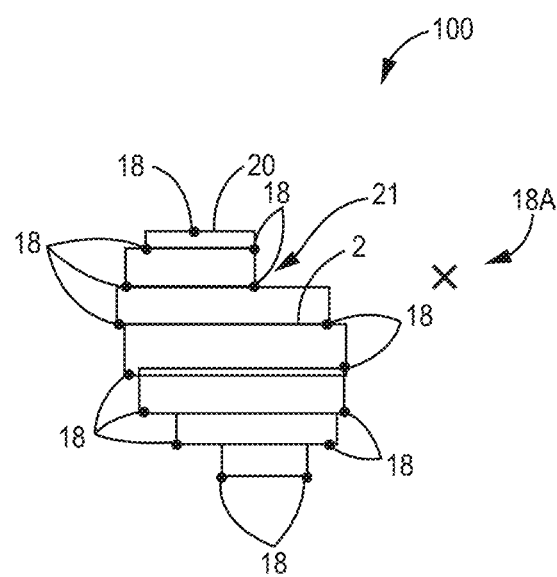
FIG. 9B shows area estimation calculations from sensor data after the elimination of the outlier shown in FIG. 9A, according to one implementation.

In one implementation, and as shown in FIGS. 9A-9B, the system 100 is configured to utilize numerical integration, whereby any perimeter measurement data point 18 that occurs outside of the defined limits or outlier threshold is an outlying data point 18A and will be excluded from the integration process in establishing the estimated cross-section area 116 of the stalk 2 via piecewise integration, such as via utilizing a replicated measurement, as is shown in the implementation of FIG. 9B. Those measurements outside of the defined limits may be altered to be the same as a previous or subsequent measurement, in certain implementations.

Figures 10A, 10B:
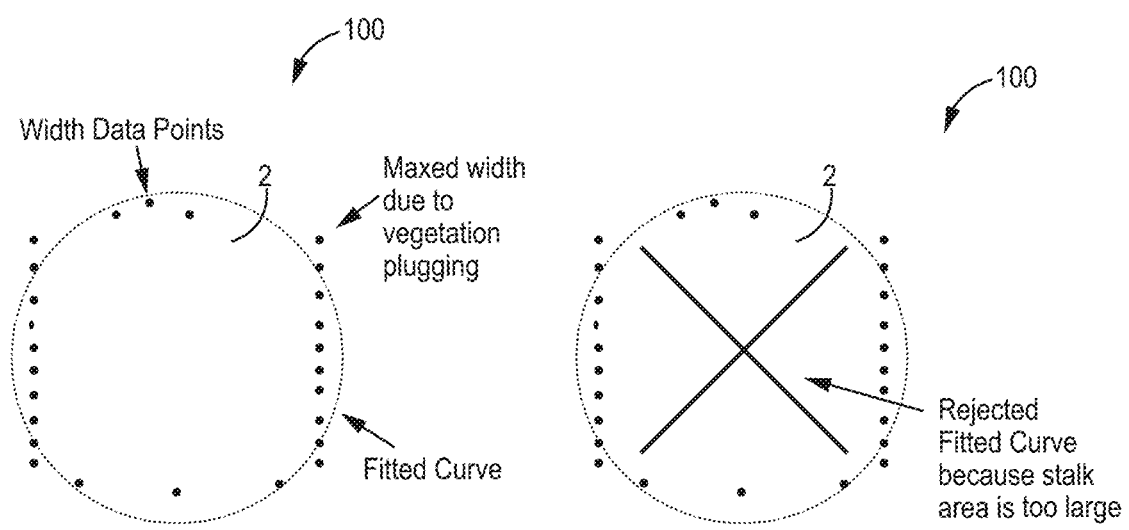
FIGS. 10A-10B show the elimination of data points/measurements due to error, according to one implementation.

Turning now to FIGS. 10A and 10B, in a still further implementation, the system 100 may reject errors by rejecting an entire result, as shown in FIG. 10B, if the total residual error generated by a best fit curve 21 or shape 21 is above a defined threshold. In some implementations, the system 100 may eliminate or reject an entire result if the calculated cross-sectional area 116 is greater or less than a defined limit or threshold. In still further implementations, the system 100 may flag or otherwise indicate that a particular measurement is an error or is likely to be an error. A user may then manually review, delete, and/or edit those results.

Figure 11:
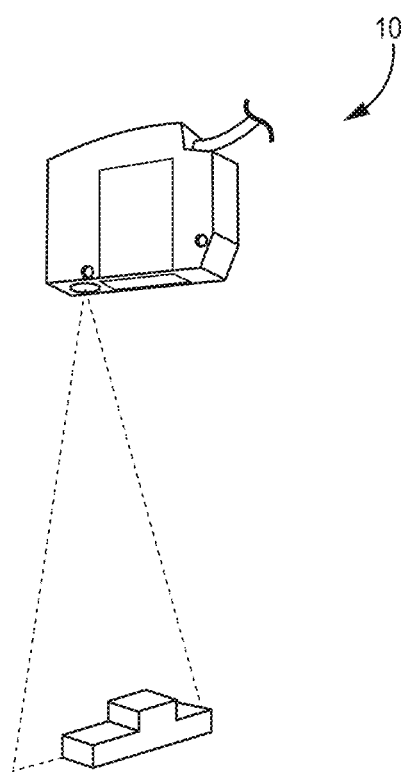
FIG. 11 shows a laser sensor, according to one implementation.

In the above-described implementations, a measurement of stalk 2 speed/velocity relative to the sensor assembly 10 is required for determining the points that make up the stalk 2 perimeter. In an alternative implementation, multiple stalk width measurements may be taken simultaneously, thereby eliminating the need to know the individual stalk 2 speed/velocity. In these implementations, the system 100 may utilize multiple contact sensors, such as those shown above at 12A, 12B, structured light, time-of-flight sensors, laser profile sensors, and/or any other known appropriate sensor type as would be appreciated by those of skill in the art. In one specific example, the system 100 may utilize an Omron ZG-WDS8T sensor, shown in FIG. 11.

Although the disclosure has been described with references to various embodiments, persons skilled in the art will recognized that changes may be made in form and detail without departing from the spirit and scope of this disclosure.

What is claimed is:

1. A method for counting and measuring stalks comprising:

generating displacement signals from one or more sensing members when a stalk passes through a sensor;
gathering stalk velocity data comprising the velocity of the stalk as it passes through the sensor;
correlating the displacement signals with the stalk velocity data;
generating stalk perimeter data from the displacement signals and the stalk velocity data; and
determining stalk cross sectional area from the stalk perimeter data,
wherein stalk cross-sectional area is determined in real-time or near real-time.

2. The method of claim 1, further comprising using one or more of rectangular integration, trapezoidal integration, and best fit curve algorithms for determining stalk cross-sectional area from the stalk perimeter data.

3. The method of claim 1, wherein the sensor comprises one or more of an electromagnetic sensor, a non-contact inductive position sensor, an inductance sensor, a capacitive sensor, an optical sensor, a flexible resistance sensor, a load cell, and an ultrasonic distance sensor.

4. The method of claim 1, further comprising generating the stalk velocity data via one or more of a radar sensor, a lidar sensor, a time-of-flight sensor, an ultrasonic sensor, and a vehicle ground speed sensor.

5. The method of claim 1, further comprising identifying and excluding outlier displacement signals.

6. The method of claim 5, further comprising establishing an outlier threshold wherein an outlier displacement signal is identified when the outlier threshold is exceeded.

7. A system for measuring a cross-sectional area of a stalk at a row unit, comprising:

(a) at least one sensor assembly disposed on the row unit, the at least one sensor assembly configured to generate width measurements as the stalk traverses the at least one sensor assembly;
(b) at least one stalk velocity sensor configured to measure a velocity of the stalks as the stalk traverses the at least one sensor assembly; and
(c) a processor in communication with the at least one sensor assembly and the at least one stalk velocity sensor,
wherein the width measurements and velocity of the stalks are processed by the processor to generate stalk perimeter data from which stalk cross-sectional area is determined,
wherein stalk cross-sectional area is determined in real-time or near real-time.

8. The system of claim 7, wherein the at least one sensor assembly comprises one or more of an electromagnetic sensor, a non-contact inductive position sensor, an inductance sensor, a capacitive sensor, an optical sensor, a flexible resistance sensor, a load cell, and an ultrasonic distance sensor.

9. The system of claim 8, wherein the at least one sensor assembly comprises an electromagnetic sensor.

10. The system of claim 9, wherein the at least one sensor assembly comprises one or more contact sensing members.

11. The system of claim 10, wherein the at least one sensor assembly comprises two contact sensing members.

12. The system of claim 10, wherein the at least one stalk velocity sensor comprises one or more of a radar sensor, a lidar sensor, a time-of-flight sensor, an ultrasonic sensor, and a vehicle ground speed sensor.

13. A system for measuring stalks on a row unit comprising:

(a) a sensor assembly disposed on the row unit, the sensor assembly comprising at least one stalk measuring sensor and at least one stalk velocity sensor; and
(b) a processor in operative communication with the sensor assembly, the processor configured to process data generated by the sensor assembly to estimate a stalk perimeter, wherein the stalk measuring sensor is configured to generate a plurality of width measurements in a time series and wherein the plurality of width measurements are correlated to an estimated stalk perimeter, wherein the at least one stalk velocity sensor is configured to generate a velocity value for each stalk as the stalk traverses the sensor assembly, and wherein stalk perimeter is determined in real-time or near real-time.

14. The system of claim 13, wherein the stalk velocity sensor comprises one or more of a radar sensor, a lidar sensor, a time-of-flight sensor, an ultrasonic sensor, and a vehicle ground speed sensor.

15. The system of claim 13, wherein the sensor assembly further comprises one or more sensing members.

16. The system of claim 13, wherein the stalk measuring sensor comprises one or more of an electromagnetic sensor, a non-contact inductive position sensor, an inductance sensor, a capacitive sensor, an optical sensor, a flexible resistance sensor, a load cell, and an ultrasonic distance sensor.

* * * * *